United States Patent Office 3,378,573
Patented Apr. 16, 1968

3,378,573
AROMATIC NITROCYANOMETHYL
COMPOUNDS
John S. Heckles, Lancaster, Pa., assignor to Armstrong Cork Company, Lancaster, Pa., a corporation of Pennsylvania
No Drawing. Filed Aug. 10, 1965, Ser. No. 478,750
2 Claims. (Cl. 260—396)

This invention relates to aromatic nitrocyanomethyl compounds.

The compounds of this invention have the structure

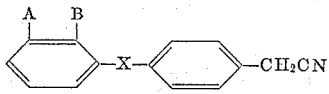

wherein one and only one of A and B is a nitro group, and X is selected from the group consisting of a covalent bond, —O—, and —$CH_2$—.

All of these compounds have highly reactive methylene hydrogen atoms, and so they all take part in a great many chemical reactions for the synthesis of dyes, pigments, and stains. They can be used to form quinoid oximes which serve as oxygen scavengers and as ultraviolet light absorbers for use in a variety of resinous coatings. The compounds readily react with themselves under alkaline conditions to give intensely colored, low molecular weight, thermally stable solids which can be used to pigment resins, particularly the vinyl chloride polymers and copolymers. The condensation product of the ortho isomer of these compounds has the structure

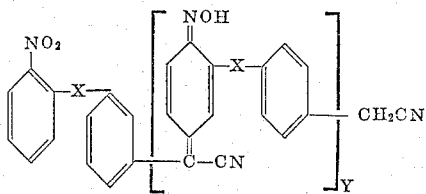

wherein X has the meaning given earlier, and Y is a small whole number in the range of 2–5, inclusive.

The following examples illustrate the invention.

EXAMPLE 1

Preparation of 2-nitro-4'-chloromethylbiphenyl

After saturation with gaseous hydrogen chloride, a mixture composed of 75 ml. of glacial acetic acid, 50 g. (0.25 mole) of 2-nitrobiphenyl, 34 g. (0.25 mole) of zinc chloride, and 22.5 g. of paraformaldehyde was heated under reflux for 12 hours while introducing a continuous slow stream of hydrogen chloride. After 45 minutes the reaction mixture became homogeneous, but separation into two layers occurred by the end of the reaction period. The cooled mixture was poured into 700 ml. of water, and the yellow oil was extracted with three 75-ml. portions of ether. The combined ether extracts were washed with three 40-ml. portions of 10% aqueous potassium carbonate, once with water, dried over sodium sulfate, and evaporated. Fractional distillation of the residual yellow oil (B.P. 175–187° C. at 0.5 mm.), gave 15.02 g. (24.1%) of the yellow biphenyl which later crystallized. Recrystallization from absolute ethanol gave pale yellow crystals, M.P. 88–89° (lit.[4] M.P. 89°).

Preparation of 2-nitro-4'-cyanomethylbiphenyl

To a stirred solution of 8 g. (0.16 mole) of sodium cyanide in 9.6 ml. of water and 10 ml. of ethanol was added 10 g. (0.04 mole) of 2-nitro-4'-chloromethylbiphenyl dissolved in 24 ml. of dioxane and 10 ml. of etahanol. After four hours at 85° C., the reaction mixture was poured into 200 ml. of water and the organic layer was extracted with two 50-ml. portions of ether. The combined ether extracts were washed with water, dried over sodium sulfate, filtered, and evaporated, leaving 9.07 g. (94.3%) of a yellow solid, M.P. 105–107°. Recrystallization to a constant melting point from absolute ethanol gave the nitrile as tan needles, M.P. 112.5–113.0°. Its infrared spectrum ($CHCl_3$) contains characteristic bands at 6.57 and 7.39 ($NO_2$) and 4.50 (CN)$\mu$.

Analysis.—Calcd. for $C_{14}H_{10}N_2O_2$: C, 70.58; H, 4.23; N, 11.76. Found: C, 70.51; H, 4.49; N, 11.46.

Polymerization of 4'-cyanomethyl-2-nitrobiphenyl

To a cooled filtered solution of 2.5 g. (0.045 mole) of potassium hydroxide (86.3%) in 5 ml. of absolute methanol contained in a 50-ml. four-necked flask, fitted with reflux condenser, dropping funnel, thermometer, and stirrer, was added dropwise 1.60 g. (0.0067 mole) of 2-nitro-4'-cyanomethylbiphenyl dissolved in 4 ml. of dioxane with stirring. The reaction temperature was kept below 25° during the initial exothermic reaction by an ice bath. After 20 minutes of stirring, a sample of the reaction mixture was withdrawn, diluted with methanol and acidified. The resulting red solid was collected by filtration, washed with water, and dried in a vacuum desiccator. Its infrared spectrum was consistent with a polyquinone oxime. After stirring an additional four hours at room temperature, the reaction mixture was extracted with eight 20-ml. portions of absolute methanol, leaving a black residue. The deep red methanol extracts were combined, filtered and carefully acidified with dilute acetic acid. The resulting finely divided dull red solid (fraction A) was collected by filtration, washed with water and dried in a vacuum oven at 53°; it weighed 0.7 g. The black residue was acidified by slurrying it in dilute acetic acid. The resulting bright red solid (fraction B), when collected, washed and dried, weighed 0.5 g.

The infrared spectra (IR 15) of Fractions A and B are nearly identical; they show strong broad hydroxyl absorption at 3.00$\mu$, sharp moderate, highly conjugated nitrile absorption at 4.54$\mu$, a very strong absorption band common to all the model quinone oximes at 10.15$\mu$ and strong nitro absorption at 6.56 and 7.45$\mu$.

While Fractions A and B of the polyoxime are insoluble in all common organic solvents, they do dissolve to a limited extent in dimethyl sulfoxide, N-methylpyrrolidone, hot hexamethylphosphoramide, cold concentrated sulfuric acid, and methanolic potassium hydroxide. Fraction A is the more soluble.

EXAMPLE 2

Preparation of 3-nitro-4'-chloromethylbiphenyl

The chloromethylation procedure was similar to that used with the isomeric 2-nitrobiphenyl. From a mixture of 30 g. (0.15 mole) of 3-nitrobiphenyl, 45 ml. of glacial acetic acid, 20.4 g. of zinc chloride and 13.5 g. of paraformaldehyde saturated with gaseous hydrogen chloride and heated at 80–90° for six hours was obtained 35.04 g. of the crude 3-nitro-4'-chloromethylbiphenyl as a yellow oil.

Preparation of 3-nitro-4'-cyanomethylbiphenyl

The procedure employed differs from that used for the preparation of the isomeric 2-nitro-4'-cyanomethylbiphenyl in reaction time and temperature. From 70 g. of crude 3-nitro-4'-chloromethylbiphenyl and 55 g. of sodium cyanide in 70 ml. of water, 140 ml. of absolute ethanol and 170 ml. of dioxane after one and one-half hours at 75–80° was obtained 55.33 g. of crude 3-nitro-4'-cyanomethylbiphenyl as a heavy yellow oil. Trituration of the oil with ether gave 26.9 g. of a light tan solid, M.P. 78–95°. An analytical sample was obtained by recrystallization from acetonitrile (four times), M.P. 116–117.5°.

Analysis.—Calcd. for $C_{14}H_{10}N_2O_2$: C, 70.51; H, 4.49; N, 11.46. Found: C, 70.37; H, 4.32; N, 11.66.

EXAMPLE 3

Preparation of 2-nitrophenyl 4-chloromethylphenyl ether

To a mixture of 8.1 g. (0.10 mole) of methyl chloromethyl ether and 2.2 g. (0.016 mole) of zinc chloride cooled to 0° C. was slowly added 20 g. (0.093 mole) of 2-nitrophenyl phenyl ether. After stirring for two and one-half hours at 0°, the reaction mixture was poured into 75 ml. of water, and the resulting aqueous mixture was extracted with three 25-ml. portions of ether. The combined ether extracts were washed with water (until washings were neutral to litmus), dried over sodium sulfate, and evaporated, leaving 20 g. of the crude 2-nitrophenyl 4-chloromethylphenyl ether as a viscous orange oil.

Preparation of 2-nitrophenyl 4-cyanomethylphenyl ether

The procedure given for the preparation of 2-nitro-4'-cyanomethylbiphenyl was employed. Heating 0.6 g. of crude 2-nitrophenyl 4-chloromethylphenyl ether for two and one-half hours at 85° with 6 g. (0.12 mole) of sodium cyanide in 9.6 ml. of water, 20 ml. of ethanol and 24 ml. of dioxane gave 8.9 g. of red oil. Fractional distillation on a spinning band column (18 in.) gave 2.4 g. of 2-nitrophenyl phenyl ether resulting from incomplete chloromethylation. Fractionation of the pot residue through a 6 in. micro Vigreaux column gave 2.1 g. of pure 2-nitrophenyl 4-cyanomethylphenyl ether as a light yellow oil (B.P. 211° at 0.1 mm.). Its infrared spectrum contains characteristic bands at 6.55 and 7.42 ($NO_2$), 8.05 (C-O) and 4.41 (CN)$\mu$.

Analysis.—Calcd. for $C_{14}H_{10}N_2O_3$: C, 66.14; H, 3.96; N, 11.02. Found: C, 65.91; H, 4.14; N, 11.16.

EXAMPLE 4

Preparation of 3-nitrophenyl 4-chloromethylphenyl ether

The chloromethylation procedure was similar to that used with the isometric 2-nitrophenyl phenyl ether. From 9.0 g. (0.112 mole) of methyl chloromethyl ether, 2.18 g. (0.016 mole) of zinc chloride, and 20 g. (0.093 mole) of 3-nitrophenyl phenyl ether was obtained 19.73 g. of the crude 3-nitrophenyl 4-chloromethylphenyl ether as a yellow oil.

Preparation of 3-nitrophenyl 4-cyanomethylphenyl ether

The procedure given for the preparation of 2-nitro-4'-cyanomethylbiphenyl was used. Heating 19.5 g. of the above crude 3-nitrophenyl 4-chloromethylphenyl ether, for one and one-quarter hours at 85° with 10.88 g. (0.22 mole) of sodium cyanide in 18 ml. of water, 36 ml. of ethanol and 44 ml. of dioxane gave 15.44 g. of dark red oil. Fractional distillation of the oil through a 6 in. micro Vigreux column gave 5.78 g. of 3-nitrophenyl phenyl ether and 3.87 g. of red viscous oil (B.P. 207–208° at 0.22 mm.) which solidified on standing. White crystals of the pure nitrile (M.P. 71.0–71.8°) were obtained after decolorization with charcoal and five recrystallizations from absolute ethanol. Its infrared spectrum (KBr) contains characteristic bands at 6.57 and 7.41 ($NO_2$), 8.09 (C-O) and 4.40 (CN)$\mu$.

Analysis.—Cald. for $C_{14}H_{10}N_2O_3$: C, 66.14; H, 3.96; N, 11.02. Found: C, 65.92; H, 4.08; N, 10.95.

EXAMPLE 5

Preparation of 2-nitrodiphenylmethane

Aluminum chloride (40 g.) was stirred into a solution of 20 g. (0.13 mole) of o-nitrobenzyl chloride in 545 ml. (5.12 mole) of benzene during five minutes while the temperature was held at 25° by an ice bath. After three days of stirring at 25°, the dark reaction mixture was poured into 500 ml. of cold acidulated water. The benzene layer was separated, washed several times with water, dried over sodium sulfate, and concentrated on a rotary evaporator. Fractional distillation of the residual red oil (20.7 g.) on a spinning band column (18 in.) yielded 12.3 g. (45.9%) of the yellow diphenylmethane: B.P. 116–118° C. at 0.06 mm.

Preparation of 2-nitrophenyl-4-chloromethylphenyl-methane

To a stirred mixture of 1.36 g. (0.01 mole) anhydrous zinc chloride and 4.99 g. (0.062 mole) of methyl chloromethyl ether was added 12.26 g. (0.057 mole) of 2-nitrodiphenyl-methane dropwise at 0° during 15 minutes. The reaction mixture was allowed to warm to room temperature, then heated at 50–55° for one hour. Because of apparent decomposition, the temperature was lowered to room temperature and stirring continued for three and one-half hours. The reaction mixture was taken up in 60 ml. of ether. The etheral solution was washed with 20 ml. of 5% sodium bicarbonate, and twice with 15 ml. portions of water, then dried over anhydrous sodium sulfate. Concentration on the rotary evaporator gave 11.4 g. of the crude product as an amber oil.

Preparation of 2-nitrophenyl-4-cyanomethylphenyl-methane

The procedure employed was similar to that used for the preparation of 2-nitro-4'-cyanomethylbiphenyl. From 11.2 g. of the above crude 2-nitrophenyl-4-chloromethylphenylmethane and 6.52 g. (0.13 mole) of sodium cyanide in 10.5 ml. of water, 22 ml. of ethanol and 26 ml. of dioxane was obtained 10.52 g. of crude product as a dark red oil. The reaction was stirred for only one hour at 85°. Cooling a hot saturated solution of the crude oil caused an oil to separate which crystallized after three months' storage in a refrigerator. An analytical sample was obtained by recrystallization from ethanol (M.P. 55–56°). Its infrared spectrum contains characteristic bands at 6.58 and 7.52 ($NO_2$) and 4.42 (CN)$\mu$.

Analysis.—Calcd. for $C_{15}H_{12}N_2O_3$: C, 71.41; H, 4.79. Found: C, 71.58; H, 4.92.

EXAMPLE 6

Preparation of 3-nitrodiphenylmethane

A solution of 80 g. (0.52 mole) of m-nitrobenzyl alcohol in 912 ml. (10.2 mole) of benzene was slowly added (15 minutes) to 868 ml. of concentrated sulfuric acid with vigorous stirring at 15°. The benzene layer was quickly separated, washed with several portions of water, dried over sodium sulfate, and evaporated. Fractional distillation of the residual pale yellow oil gave 56.2 g. (50.4%) of the light yellow diphenylmethane: B.P. 114–117° at 0.04 mm.

Preparation of 3-nitrophenyl-4-chloromethylphenyl-methane

The chloromethylation procedure was similar to that used for the preparation of the isomeric 2-nitrophenyl-4-cyanomethylphenylmethane. 3-nitrodiphenylmethane (38 g., 0.18 mole) when stirred for four and one-half hours at 60° with 14.9 ml. (0.196 mole) of methyl chloromethyl ether and 4.2 g. (0.031 mole) of zinc chloride gave 38.2 g. of crude 3-nitrophenyl-4-chloromethylphenylmethane as a yellow oil.

Preparation of 3-nitrophenyl-4-cyanomethylphenyl-methane

The procedure given for the preparation of 2-nitro-4'-cyanomethylbiphenyl was used. From 36 g. of the above crude 3-nitrophenyl-4-chloromethylphenylmethane and 20.6 g. (0.42 mole) of sodium cyanide in 33 ml. of water, 75 ml. of ethanol and 82 ml. of dioxane was obtained a viscous dark oil. The oil partially solidified after standing several hours at room temperature. Trituration of the semi-solid with ether gave 7.0 g. of tan crystals, M.P. 95–99°. White crystals of the pure nitrile (M.P. 104.8–105.5°) were obtained after decolorizing with charcoal and four recrystallizations from carbon tetrachloride. Its infrared spectrum (KBr) contains characteristic bands at 6.59 and 7.35 ($NO_2$) and 4.41 (CN)$\mu$.

*Analysis.*—Calcd. for $C_{15}H_{12}N_2O_2$: C, 71.41; H, 4.79; N, 11.11. Found: C, 71.66; H, 5.03; N, 11.06.

I claim:
1. A nitrocyanomethyl compound of the structure

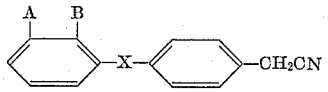

wherein one and only of A and B is a nitro group, and X is selected from the group consisting of a covalent bond, —O—, and —$CH_2$—.

2. The alkaline, self-condensation products of the compounds of claim 1 having the formula:

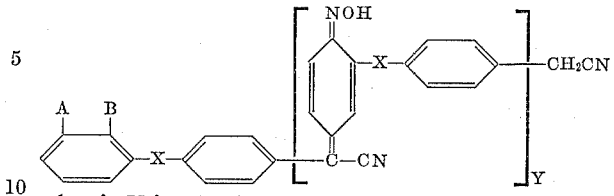

wherein Y is a small whole number in the range of 2–5, inclusive, and X is selected from the group consisting of a covalent bond, —O—, and —$CH_2$—.

References Cited

UNITED STATES PATENTS 3,156,704    11/1964    Davis _____ 260—396

LORRAINE A. WEINBERGER, *Primary Examiner.*

L. A. THAXTON, *Assistant Examiner.*